(12) United States Patent
Tsubouchi et al.

(10) Patent No.: US 6,575,077 B2
(45) Date of Patent: Jun. 10, 2003

(54) VACUUM SERVO UNIT

(75) Inventors: Kaoru Tsubouchi, Toyota (JP); Akihiko Miwa, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 51 days.

(21) Appl. No.: 09/867,427

(22) Filed: May 31, 2001

(65) Prior Publication Data

US 2002/0011147 A1 Jan. 31, 2002

(30) Foreign Application Priority Data

May 31, 2000 (JP) ........................................ 2000-163095

(51) Int. Cl.[7] .................................................. F15B 9/10
(52) U.S. Cl. ...................................................... 91/369.1
(58) Field of Search ............................ 91/369.2, 369.3, 91/369, 376 R

(56) References Cited

U.S. PATENT DOCUMENTS

| 5,493,946 | A | * | 2/1996 | Schluter | 91/376 R |
| 5,605,088 | A | * | 2/1997 | Balz et al. | 91/369.1 |
| 6,119,577 | A | * | 9/2000 | Takasaki et al. | 91/376 R |
| 6,135,007 | A | * | 10/2000 | Tsubouchi | 91/369.2 |
| 6,425,312 | B2 | * | 7/2002 | Takayama et al. | 91/367 |

FOREIGN PATENT DOCUMENTS

JP 2000-108880 4/2000

* cited by examiner

Primary Examiner—Edward K. Look
Assistant Examiner—Igor Kershteyn
(74) Attorney, Agent, or Firm—Burns, Doane, Swecker & Mathis, LLP

(57) ABSTRACT

A vacuum servo unit is provided with an actuator for controlling the distance between the engaging portion of a first input member with a reaction disc and an air pressure valve seat in response to a driving force. The vacuum servo unit further includes a rubber member disposed between the first input member and a movable core. The rubber member is deformable in response to the relative movement of the first input member and the movable member forming a part of the actuator. When the actuator is inactive, an axial space is formed between the reaction member and the first input member and between the first input member and a second input member.

18 Claims, 10 Drawing Sheets

VACUUM SERVO UNIT

This application is based on and claims priority under 35 U.S.C. §119 with respect to Japanese Application No. 2000-163095, filed on May 31, 2000, the entire content of which is incorporated herein by reference.

FIELD OF THE INVENTION

This invention generally relates to vehicle brake systems. More particularly, the present invention pertains to a vacuum servo unit used in an automobile brake system.

BACKGROUND OF THE INVENTION

A known vacuum servo unit for an automobile is disclosed in a Japanese patent application published as Toku-Kai 2000-108880. The vacuum servo unit described in this application is accommodated with a solenoid actuator. An input member disposed in the vacuum servo unit is divided into a front portion and a rear portion. The front portion of the input member is adapted to contact a reaction member, while the rear portion of the input member is movable back and forth relative to the front portion. An elastic member is disposed between the front portion of the input member and a solenoid plunger (movable core), and is elastically deformable by relative movement of the front portion of the input member and the plunger. The aforementioned vacuum servo unit is self-operated by balancing the reaction force from the reaction member and the attraction force of the solenoid plunger. Accordingly, the vacuum servo unit is actuated to control a braking force continuously in response to the vehicle running condition even when the self-operation is performed.

In the above-described known vacuum servo unit, a continuous control of the entire output range of the vacuum servo unit is required. Therefore, the electric current consumption by the solenoid actuator may be increased, thus requiring an increase in the size of the solenoid actuator. In addition, the known vacuum servo unit needs to be relatively complex in structure to carry out fine output control such as inter-vehicle distance control to maintain a safe distance between automobiles.

In light of the foregoing, it would be desirable to provide a vacuum servo unit that is capable of carrying out carry an appropriate brake control corresponding to the situation.

A need exists for a vacuum servo unit which is capable of being self-operated for braking control without requiring the same amount of electric current consumption.

A need also exists for a vacuum servo unit which is capable of being self-operated for braking control while at the same time possessing a solenoid actuator of reduced size compared to the known unit.

SUMMARY OF THE INVENTION

According to an aspect of the present invention, a vacuum servo unit includes a housing, a movable wall, a power piston, an input member, an output member, a reaction member, a valve seat, an actuator and a force transmitting member. The movable wall is disposed in the housing for dividing the interior of the housing into at least to a front chamber and a rear chamber. The power piston is connected to the movable wall and is movable with the movable wall. The input member is disposed in the power piston and is movable in the forward and rearward directions by an input force relative to the power piston. The input member further has a front portion and a rear portion, with the rear portion of the input being movable in the forward and rearward directions with respect to the front portion. The output member is operatively connected to the power piston for outputting a forwarding force of the power piston in response to the movement of the movable wall. The reaction member is disposed between the input and the output member for transmitting a reaction force to the input member corresponding to an output force generated by the output member. The reaction member is engageable with an engaging portion of the front portion of the input member. The valve seat is movable in the forward and rearward directions in response to the movement of the input member. The actuator has a movable member that moves the front portion of the input member and the valve seat, and an actuating member. The actuating member serves for moving the movable member to control the distance between the engaging portion of the front portion and the valve seat in response to a driving force. The force transmitting member is disposed between the front portion of the input member and the movable member of the actuator and is deformable in response to relative movement of the front portion and the movable member. The vacuum servo unit can also be constructed to include a first axial space between the reaction member and the front portion and a second axial space formed between the front portion and the rear portion of the input member when the actuator is inactive.

In the vacuum servo unit of the present invention, "jumping operation" is performed until the condition arises in which a reaction force is transmitted to the input member corresponding to the output force generated by the output member. The output force generated by the "jumping operation" is called the output force by the jumping operation. When the actuator is inactive during a normal brake operation, the total amount of a clearance between the reaction member and the front portion of the input member and a clearance between the front portion of the input member and the rear portion of the input member is a clearance to perform the jumping operation. On the other hand, when the actuator is active, only the clearance between the reaction member and the front portion of the input member becomes the clearance to perform the jumping operation.

The force transmitting member can be disposed between the front portion of the input member and the movable member without an axial space between the front portion and the movable member. When the actuator is active, the force transmitting member is deformed by the rearward biasing force of the front portion of the input member and the biasing force of the movable member of the actuator after the reaction member is in contact with the front portion of the input member. The valve seat engaged with the movable member of the actuator is movable in the forward direction corresponding to the deformation resistance of the force transmitting member to introduce air into the rear chamber of the housing. Therefore, the valve seat is continuously movable corresponding to the forward movement of the movable member of the actuator.

With the present invention, the vacuum servo unit is designed so that the output force of the jumping operation by self operation of the actuator is smaller than the output force of the jumping operation by the normal braking operation by the driver. Therefore, a fine control of the output force and a sensitive braking operation such as an inter-vehicle distance control can be carried out by the vacuum servo unit of the present invention.

According to another aspect of the present invention, the front portion of the input member is retracted in the rearward direction relative to the power piston by the reaction member when the actuator is active. In this case, it is favorable that the retracted distance of the front portion relative to the power piston is limited to a predetermined value.

When the front portion of the input member is retracted by the reaction member, the retracted distance of the front portion relative to the power piston is controlled to be less than the predetermined value. When the driving force by the actuator reaches the predetermined value which is the maximum driving force or less than that, the retraction of the front portion of the front member relative to the power piston is stopped, wherein the driving force supplied to the force transmitting member is not increased any more. Therefore, the vacuum servo unit of the present invention can generate the maximum output force when the driving force generated by the actuator is the predetermined value or larger.

The self operation of the actuator according to the vacuum servo unit of the present invention is continuously performed within a small output force corresponding to the driving force generated by the movable member of the actuator. Further, compared with self operation to continuously control the entire output range of the vacuum servo unit, the electric current consumption by the vacuum servo unit of the present invention is decreased. Further, the maximum output force can be generated when the driving force by the actuator is the predetermined value or larger. Thus, the vacuum servo unit of the present invention can be appropriately utilized for an emergency braking assist which requires the maximum output force.

According to a further aspect of the present invention, it is preferable that an axial space be provided between the front portion of the input member and the force transmitting member or between the force transmitting member and the movable member. The output force of the jumping operation with the actuator being active thus becomes larger than that with the normal braking operation by the driver.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
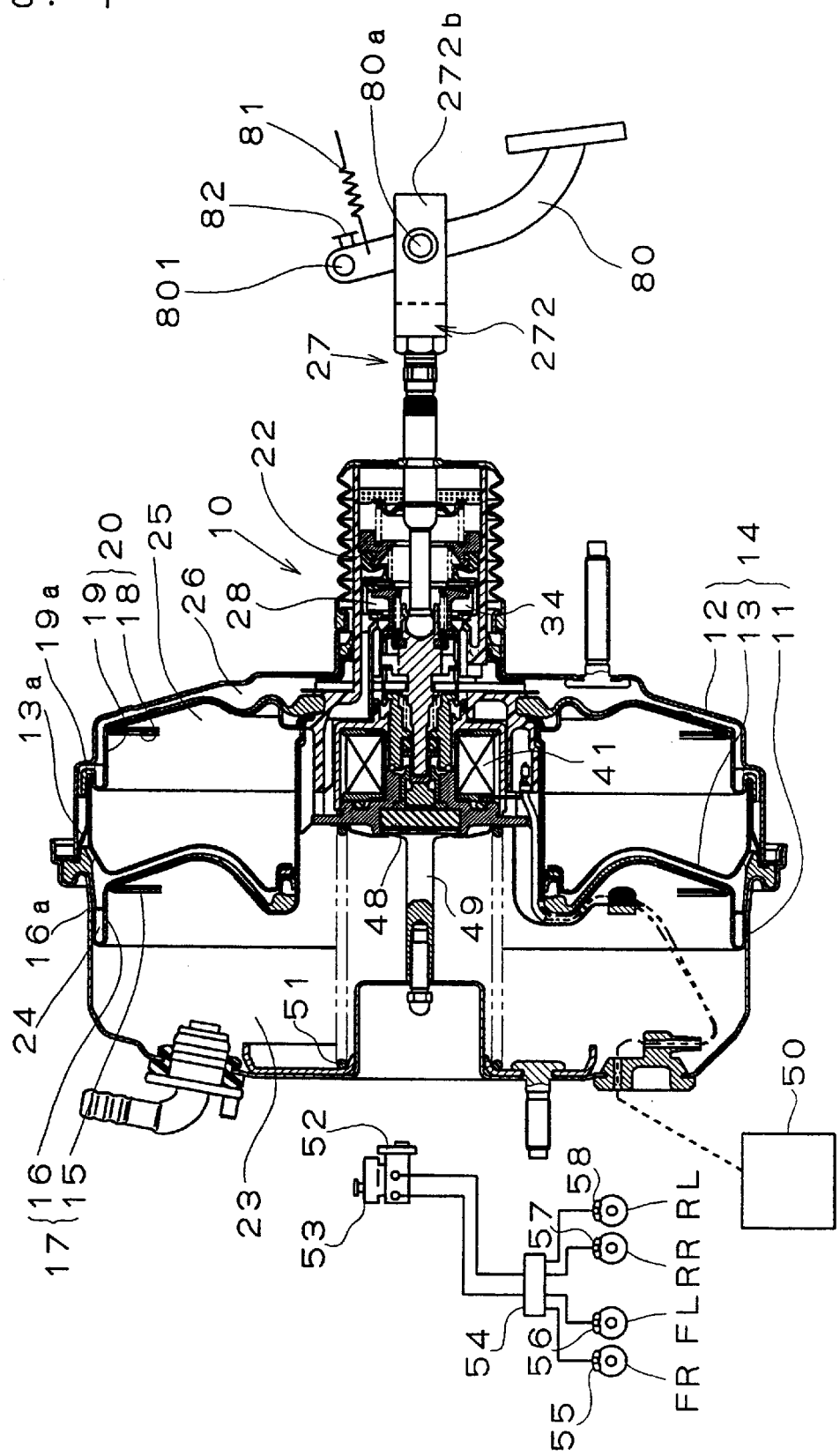
FIG. 1 is a cross-sectional view of a vacuum servo unit for a vehicle braking system according to a first embodiment of the present invention.
Figure 2:
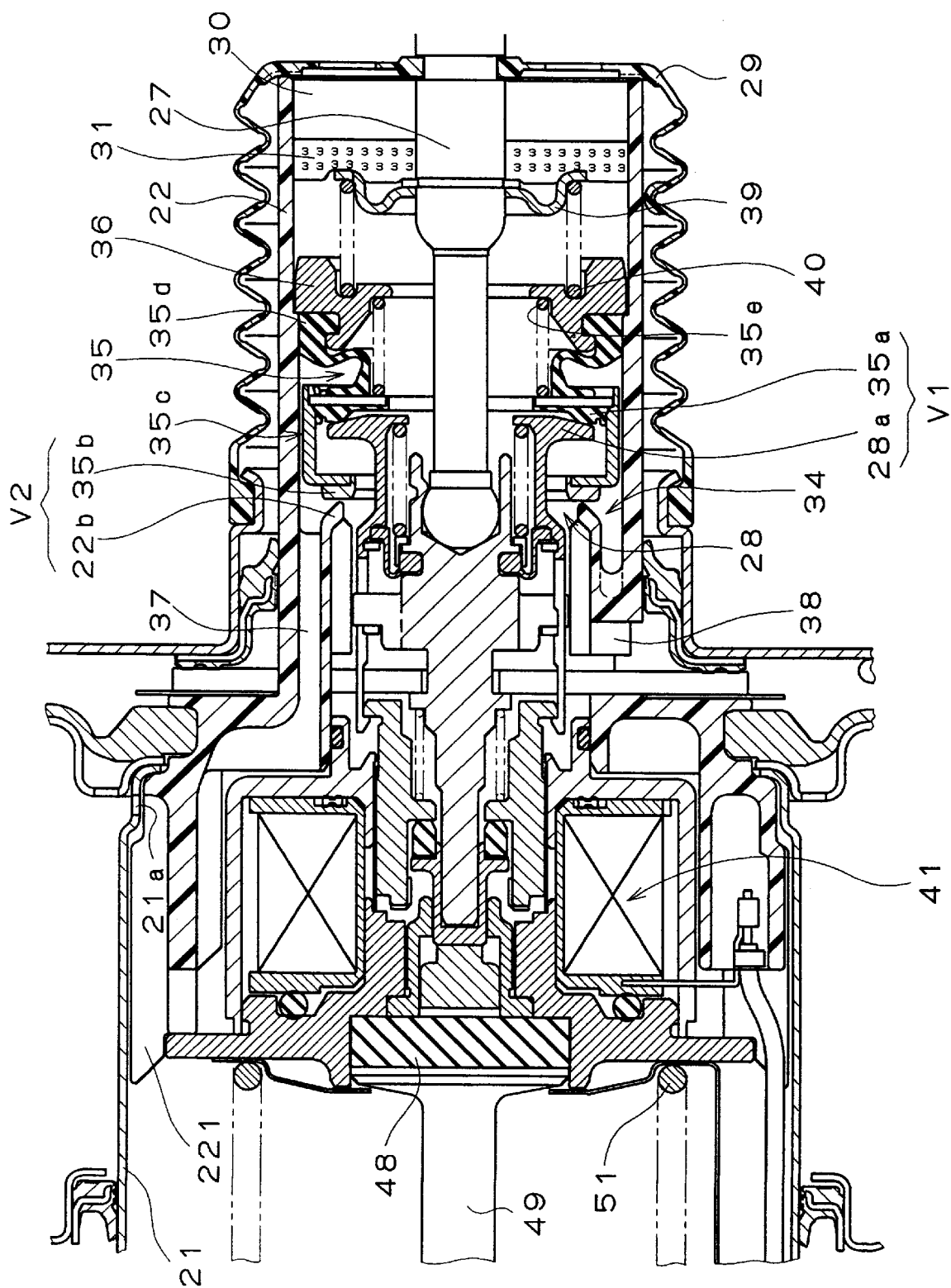
FIG. 2 is an enlarged cross-sectional view of a portion of the vacuum servo unit shown in FIG. 1.
Figure 3:
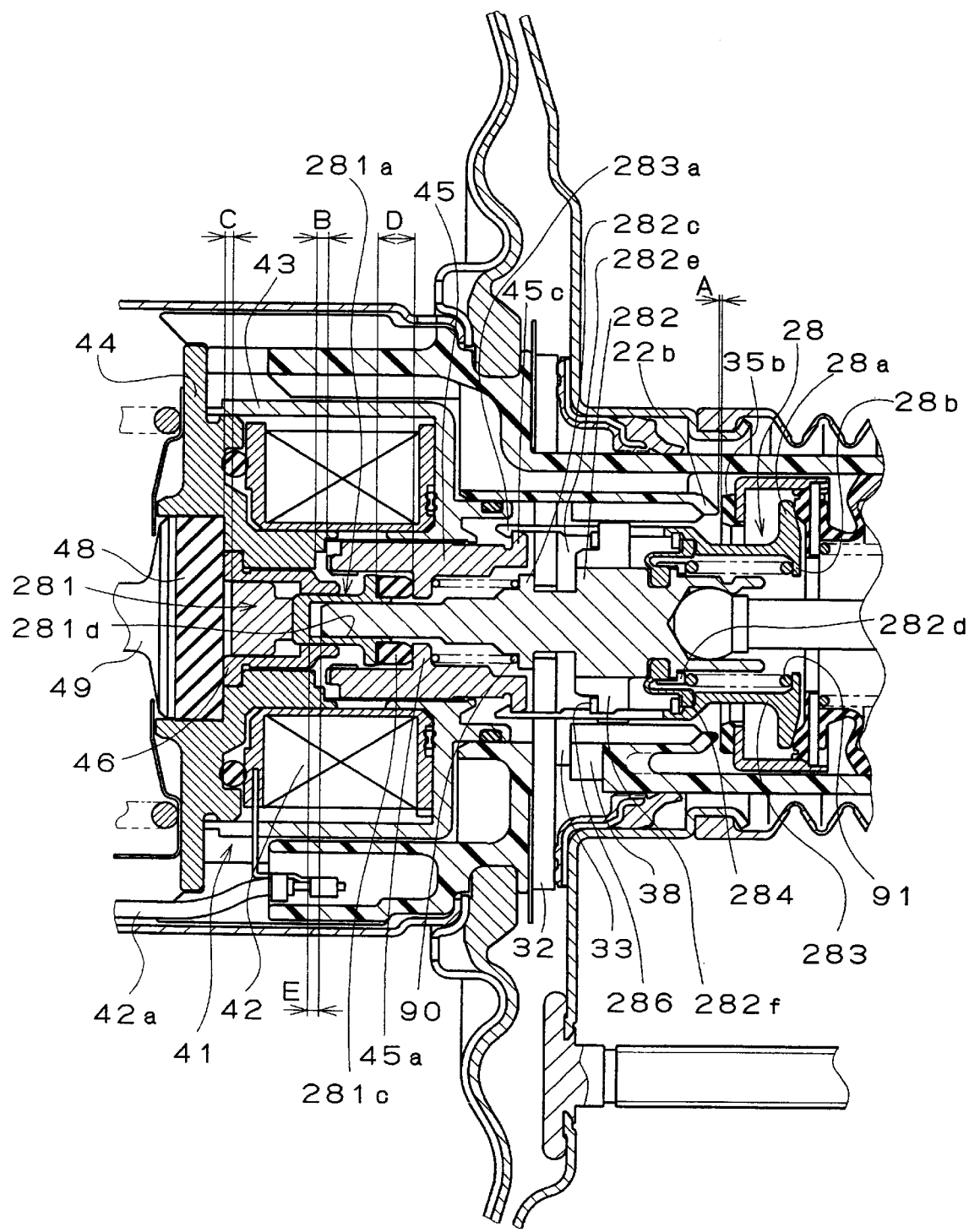
FIG. 3 is an enlarged cross-sectional view of the actuator and valve mechanism of the vacuum servo unit shown in FIG. 1.

Referring to FIGS. 1, 2 and 3, the vacuum servo unit (tandem type vacuum servo unit) 10 of the present invention is used in conjunction with an automobile brake system and is formed of a housing 14 having a front shell 11, a rear shell 12, and a dividing member 13 disposed between the shells 11, 12. A front side pressure chamber and a rear side pressure chamber are thus defined in the housing 14. A front side wall 17 is disposed in the front side pressure chamber and is movable back and forth, while a rear side wall 20 is disposed in the rear side pressure chamber and is movable back and forth.

The front side wall 17 includes a metal plate 15 and a rubber diaphragm 16. Similarly, the rear side wall 20 includes a metal plate 18 and a rubber diaphragm 19. The front side pressure chamber in the housing 14 is divided into a first front chamber 23 and a first rear chamber 24, while the rear side pressure chamber in the housing 14 is divided into a second front chamber 25 and a second rear chamber 26. The first front chamber 23 is connected to an engine intake manifold (not shown) serving as a negative pressure source so that the first front chamber 23 is always maintained at a negative pressure when the engine unit is actuated.

The plate 15 is integrally formed with a central cylindrical part 21 passing through the center of the dividing member 13 in a slidable and air-tight manner. The second front chamber 25 is connected to the first front chamber 23 via a hole 21a formed in the cylindrical part 21 of the plate 15 and a groove 221 formed in a power piston 22. Therefore, the first and second front chambers 23, 25 are always maintained at a negative pressure when the engine unit is actuated. The first rear chamber 24 is connected to the second rear chamber 26 via a groove 16a formed in the diaphragm 16, a hole 13a, and a groove 19a.

The vacuum servo unit 10 further includes an input rod 27 disposed in the power piston 22 and movable back and forth relative to the power piston 22. The front end portion of the input rod 27 is engaged with an input member 28 via a ball joint connection. The input member 28 is guided by the power piston 22 and is slidably movable back and forth (i.e., in the right-left direction in FIG. 1) within the power piston 22.

On the other hand, the rear portion of the input rod 27 is engaged with a brake pedal 80 as shown in FIG. 1. An air filter 30 and a noise-absorbing member 31 are disposed in the rear opening portion of the power piston 22. The inner space of the power piston 22 is exposed to atmospheric pressure via the air filter 30 and the noise-absorbing member 31.

The input member 28 includes a first member 281, a second member 282, and a third member 283. The first member 281 is disposed in the front side (i.e., left side in FIG. 3) of the power piston 22. The front surface of the first member 281 is adapted to contact the rear surface of a reaction disc 48. The second member 282 is disposed coaxially with the first member 281 at the rear side (i.e., right side in FIG. 3) of the first member 281 and engaged with the input rod 27 by the ball joint connection. The third member 283 is substantially cylindrical and is disposed at the outer periphery of the second member 282. Further, the third member 283 is coaxially disposed with the second member 282 and is movable back and forth relative to the second member 282.

In addition, the rear end of the third member 283 is provided with an air valve seat 28a. A diaphragm 284 is disposed between the outer periphery of the second member 282 and the inner periphery of the third member 283, and serves to hermetically seal the space between the second member 282 and the third member 283.

The rear portion of the first member 281 is provided with a concave or recessed portion 281d opening in the rearward direction. The front end portion of the second member 282 is slidably disposed in the recessed portion 281d and is movable in the axial direction (i.e., the right-left direction in FIG. 3). Therefore, the first member 281 is movable back and forth relative to the second member 282.

A key member 32 is disposed in the power piston 22 and serves to regulate or define a front limit and a rear limit movement position of the input member 28 relative to the power piston 22. The key member 32 is inserted into a hole 33 radially defined in the power piston 22. The key member 32 engages the power piston 22 so that the key member 32 does not fall from the power piston 22.

A valve mechanism 34 is disposed in the power piston 22 and is changed over depending on the axial position of the input member 28 which is movable relative to the power piston 22. The valve mechanism 34 is adapted to establish three conditions in the power piston 22, namely an output force decreasing condition, an output force maintaining condition, and an output force increasing condition. Under the output force decreasing condition, the second rear chamber 26 is in communication with the first front chamber 23 and is separated from the atmosphere. Under the output force maintaining condition, the second rear chamber 26 is separated from both the first front chamber 23 and the atmosphere. Under the output force increasing condition, the second rear chamber 26 is separated from the first front chamber 23 and is in communication with the atmosphere.

The valve mechanism 34 includes the air valve seat 28a integrally formed with the third member 283, a negative pressure valve seat 22b integrally formed with the power piston 22, an atmospheric pressure sealing portion 35a, and a negative pressure sealing portion 35b, which are all included as a unit in a control valve 35. Both the air valve seat 28a and the negative pressure valve seat 22b are in the form of a substantially ring-shaped or annular structure and face in the rearward direction (i.e., to the right side in FIG. 3). The atmospheric pressure sealing portion 35a opposes the air valve seat 28a and can be either in contact with the air valve seat 28a or separated from the air valve seat 28a. The negative pressure sealing portion 35b opposes the negative pressure valve seat 22b and can be either in contact with the negative pressure valve seat 22b or separated from the negative pressure valve seat 22b.

As shown in FIGS. 2 and 3, principal components of the control valve 35 include a movable portion 35c, a stationary portion 35d, and a valve spring 35e. The movable portion 35c includes as an integral structure the sealing portions 35a, 35b. The stationary portion 35d is hermetically fixed with the power piston 22 by a spring retainer 36. The valve spring 35e serves to push the movable portion 35c in the forward direction.

An atmospheric pressure valve V1 is formed by the atmospheric pressure sealing portion 35a and the air valve seat 28a, while a negative pressure valve V2 is formed by the negative pressure sealing portion 35b and the negative pressure valve seat 22b. A vacuum passage 37 is defined in the power piston 22 and serves to connect the negative pressure valve V2 with the first front chamber 23. An air passage 38 is defined in the power piston 22 and serves to connect the air pressure valve V1 with the second rear chamber 26. The inner space of the stationary portion 35d is in communication with the atmosphere via the noise-absorbing member 31, the air filter 30 and the rear opening portion of the power piston 22. When the air valve seat 28a is in contact with the atmospheric pressure sealing portion 35a, communication between the second rear chamber 26 and the atmosphere is interrupted. On the other hand, when the air valve seat 28a is separated from the atmospheric pressure sealing portion 35a, communication between the second rear chamber 26 and the atmosphere is established. When the negative pressure valve seat 22b is in contact with the negative pressure sealing portion 35b, communication between the first front chamber 23 and the second ,ear chamber 26 is interrupted. On the other hand, when the negative pressure seat valve seat 22b is separated from the negative pressure sealing portion 35b, communication between the first front chamber 23 and the second rear chamber 26 is established.

A return spring 40 is disposed between the spring retainer 36 and another spring retainer 39 that is engaged with the input rod 27. The return spring 40 serves to push the input rod 27 and the input member 28 in the rearward direction. Accordingly, as shown in FIG. 2 which illustrates an initial stage of the unit when the brake pedal 80 is not depressed, the air valve seat 28a is in contact with the atmospheric pressure sealing portion 35a. Meanwhile, the negative pressure sealing portion 35b is separated from the negative pressure valve seat 22b. At this initial stage, a gap or clearance A (shown in FIG. 3) is defined between the negative pressure valve seat 22b and the negative pressure sealing portion 35b.

As illustrated in FIG. 3, an actuator 41 is accommodated in the front portion of the power piston 22. The actuator 41 includes a solenoid coil 42, a magnetic yoke 43, a magnetic stationary core 44, and a magnetic movable core 45. The magnetic movable core 45 is disposed at the outer periphery of the input member 28 so as to be movable back and forth (i.e., in the right-left direction in FIG. 3) relative to the power piston 22 and the input member 28. The movable core 45 is in the form of a substantially cylindrical unit provided with a radially inwardly directed flange portion 45a at the intermediate or middle portion of the movable core 45. The movable core 45 is also provided with a radially outwardly directed flange portion 45c at the rear end portion of the movable core 45.

The rear portion of the first member 281 is provided with an engaging portion 281a which is adapted to contact the inwardly directed flange portion 45a. The engaging portion 281a is provided with a radially outwardly directed flange portion at the rear opening portion of the recessed portion 281d. The engaging portion 281a is further provided with a rubber annular member 281c. The rubber annular member 281c is integrally provided at the rear surface of the outward flange portion of the engaging portion 281a. This rubber annular member 281c is compressed by forward movement of the movable core 45 and can be elastically deformed back and forth. The rubber annular member 281c has an axial length identified as D in FIG. 3.

The third member 283 has a front end portion 283a which engages the outward flange portion 45c of the movable core 45. The second member 282 is provided with a front outward flange portion 282c projecting radially outwardly at an intermediate or middle portion of the second member 282. A spring 90 is disposed between the rear surface of the inward flange portion 45a of the movable core 45 and the front surface of the front outward flange portion 282c of the second member 282. The spring 90 applies a biasing force pushing or urging the movable core 45 in the forward direction.

A valve spring 91 is disposed between a spring retainer 282d supporting the diaphragm 284 and a radially inwardly directed flange portion 28b formed at the rear end portion of the third member 283. The valve spring 91 serves to push the third member 283 in the rearward direction. The rearward biasing force of the valve spring 91 moves the valve mechanism 34 in the rearward direction against the biasing force of the spring 90 and the valve spring 35e to open the negative pressure valve V2. Therefore, the movable core 45 is movable back and forth integrally with the input member 28 relative to the power piston 22. A guiding member 46 supports the first member 281 which is slidably and movably guided in the guiding member 46.

The solenoid coil 42 is accommodated at the outer periphery of the movable core 45. The solenoid coil 42, the yoke 43, the stationary core 44 are fixed with the power piston 22. The solenoid coil 42 is electrically connected with an electronic control device 50 (shown in FIG. 1) by a lead wire 42a. The control device 50 is located outside the housing 14. When the solenoid coil 42 is de-energized (i.e., when the actuator 41 is inactive), a predetermined clearance is defined between the front end surface of the movable core 45 and the rear end surface of the stationary core 44. On the other hand, when the solenoid coil 42 is energized (i.e., when the actuator 41 is active), an electromagnetic attraction force is generated between the stationary core 44 and the movable core 45. Therefore, the movable core 45 is moved in the forward direction by virtue of the electromagnetic attraction force. The maximum distance of the movable core 45 for moving forward corresponds to the length identified by the clearance B (shown in FIG. 3) between the stationary core 44 and the movable core 45.

The rubber reaction disc 48 is disposed in a large diameter portion of a stepped hole defined at the front end surface of the stationary core 44. An output rod 49 is hermetically inserted into the center portion of the front shell 11 of the housing 14. The rear end portion of the output rod 49 is engaged with the front side of the reaction disc 48 and is slidably disposed in the large diameter portion of the stepped hole of the stationary core 44.

As is commonly known, the reaction disc 48 has two functions. The reaction disc 48 can transfer the forward force of the power piston 22 and the input member 28 to the output rod 49. The reaction disc 48 can also transfer a reaction force relative to the output force from the output rod 49 to the input member 28, whereby the input member 28 is moved rearward. Under the aforementioned initial stage, a predetermined clearance C is defined between the rear surface of the reaction disc 48 and the front end surface of the input member 28, or the front end surface of the first member 281.

A return spring 51 is disposed at the center portion of the first front chamber 23 to retract the power piston 22 and both movable walls 17, 20 relative to the housing 14. The brake pedal 80 is biased to the initial position in a counterclockwise direction around an axis 801 (in FIG. 1) by virtue of the biasing force of the return spring 51. The rotation of the brake pedal 80 is restricted by being in contact with a stopper 82, thus defining the initial position of the brake pedal 80.

The output rod 49 is connected to a piston of a master cylinder 52. The master cylinder 52 is provided with or connected to a reservoir tank 53. Furthermore, the master cylinder 52 is connected with an actuator part 54 via hydraulic passages. The actuator part 54 serves to control various systems such as ABS (antilock brake system), TRC (traction control) and a steering control under braking such as VSC (vehicle stability control). The actuator part 54 is connected to each wheel cylinder 55, 56, 57, 58 operatively associated with respective rotating wheels FR, FL, RR, RL by the hydraulic passage.

Figure 7:
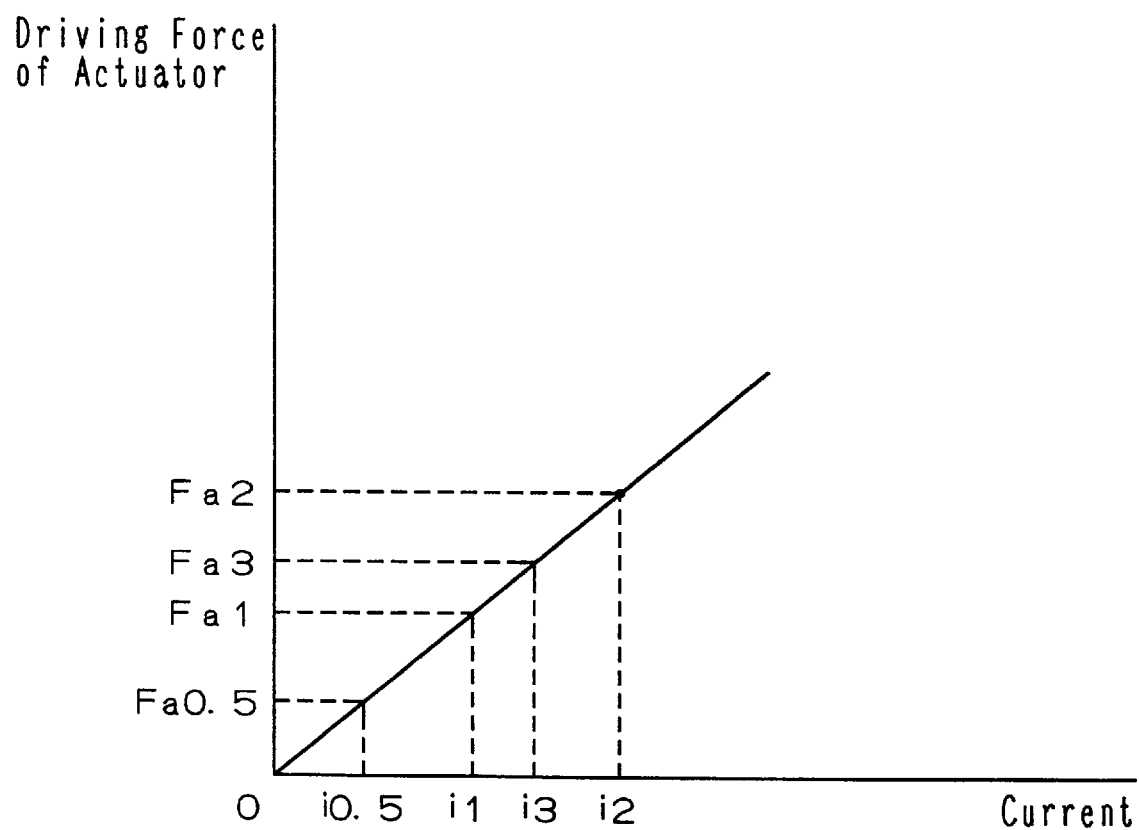
FIG. 7 is a graph depicting the electric current and driving force characteristics associated with the actuator of the present invention.

FIG. 7 illustrates the characteristic relationship between the electric current supplied to the solenoid coil 42 and the driving force of the actuator 41 according to the present invention. As shown in FIG. 7, when an amount i1 of current is supplied to the solenoid coil 42, for example, the driving force generated by the actuator 41 is set to be at Fa1. When the amount i2 of current is supplied to the solenoid coil 42, the driving force generated by the actuator 41 is set to be at Fa2.

A normal braking operation according to the first embodiment of the present invention is described below with the actuator 41 being inactive. An engaging shaft 80a of the brake pedal 80 is engaged with an engaging hole defined at the rearward portion of the input rod 27. Therefore, when the brake pedal 80 is depressed with an input force Fi1 to carry out the normal braking operation by a driver, the input rod 27 is moved in the forward direction relative to the power piston 22. Accordingly, the second member 282 of the input member 28 is moved forward integrally with the input rod 27. Corresponding to the forward movement of the second member 282, the front surface of a projecting portion 282f of the second member 282 is engaged with an engaging portion 286 which is disposed with the third member 283. Therefore, the third member 283 is moved forward integrally with the second member 282. (When the actuator 41 is active, the engaging portion 286 does not interrupt the movement of the third member 283 to the left side in FIG. 3). Therefore, the input member 28, the movable core 45 and the input rod 27 are moved forward as a unit relative to the power piston 22.

Corresponding to the forward movement of the input member 28, the movable portion 35c of the control valve 35 is advanced forward integrally with the input member 28 by virtue of the forward force from the valve spring 35e. Therefore, the negative pressure sealing portion 35b comes in contact with the negative pressure valve seat 22b, whereby the negative pressure valve V2 is closed. Under the above condition, the clearance between the rear surface of the reaction disc 48 and the front end surface of the first member 281 becomes a distance (C–A). The closing operation of the negative pressure valve V2 interrupts communication between the vacuum passage 37 and the air passage 38, whereby the communication between the second rear chamber 26 and the first front chamber 23 is interrupted. Therefore, the valve mechanism 34 is changed over from the output force decreasing condition to the output force maintaining condition.

From the output force maintaining condition of the valve mechanism 34, the input rod 27, the input member 28 and the movable core 45 are further moved in the forward direction, wherein the air valve seat 28a of the input member 28 is separated from the atmospheric pressure sealing portion 35a of the control valve 35 by a distance of α. Therefore, the air valve V1 is opened. Under the above condition, the clearance between the rear surface of the reaction disc 48 and the front end surface of the first member 281 becomes a distance length of (C–A–α).

By the opening of the air valve V1, air communication between the air passage 38 and the atmosphere is established through the clearance between the air valve seat 28a and the atmospheric pressure sealing portion 35a, the inner space of the stationary portion 35d, the noise-absorbing portion 31, the air filter 30 and the rear opening portion of the power piston 22. Therefore, the second rear chamber 26 is communicated with the atmosphere, whereby the valve mechanism 34 is changed over to the output force increasing condition from the output force maintaining condition.

By changing to the output force increasing condition, atmospheric air is introduced into the second rear chamber 26. Further, atmosphere air is introduced into the first rear chamber 24 from the second rear chamber 26, wherein the pressure in both chambers 24, 26 is increased. Accordingly, a forward force is generated by the pressure difference between the first front chamber 23 and the first rear chamber 24 at the movable wall 17. A forward force is also generated by the pressure differential between the second front chamber 25 and the second rear chamber 26 at the movable wall 20. Further, the forward force generated by the aforementioned pressure differentials is applied to the power piston 22. The entire above-described forwarding (or advancing) force is transmitted to the output rod 49 via the power piston 22, the stationary core 44 of the actuator 41, and the reaction disc 48. The movable walls 17, 20, the power piston 22 and the output rod 49 are integrally moved forward relative to the housing 14, whereby the operation of the master cylinder 52 is activated by the forward movement of the output rod 49 which is connected to the master cylinder piston.

Upon the above condition, the power piston 22 is also advanced forwards not only relative to the housing 14 but also relative to the input member 28. Therefore, the atmospheric pressure sealing portion 35a approaches the air valve seat 28a. Additionally, the reaction disc 48 is compressed and deformed by the forward movement of the power piston 22 and the output rod 49, and retracts in the rearward direction. In other words, the reaction disc 48 expands into the center hole of the guiding member 46 which is a small diameter portion of the stepped hole of the stationary core 44. The rearward expansion of the reaction disc 48 serves to compensate for the clearance (C–A–α) between the reaction disc 48 and the input member 28 generated by the separation of the air pressure valve seat 28a from the atmospheric pressure sealing portion 35a, the clearance between the reaction disc 48 and the first member 281 newly defined due to the movement of the power piston 22 relative to the input member 28, and the clearance E between the first member 281 and the second member 282. According to the forward movement of the power piston 22 relative to the input member 28, the atmospheric pressure sealing portion 35a again contacts the air valve seat 28a, whereby the communication of the air passage 38 with the atmosphere is interrupted. Therefore, air flow into both chambers 24, 26 is stopped, and the valve mechanism 34 is changed over to the output force maintaining condition from the output force increasing condition.

Corresponding to the rearward expansion of the reaction disc 48, the engaging portion 281a is retracted. Additionally, the second member 282 is retracted integrally with the third member 283 as well. The amount of retraction of the input member 28 relative to the power piston 22 is approximately equivalent to the distance α between the air valve seat 28a and the atmospheric pressure sealing portion 35a during the transfer of the valve mechanism 34 from the output force increasing condition to the output force maintaining condition. Meanwhile, the retraction amount of the reaction disc 48 is approximately equal to a distance (C+E–A) during the transfer of the valve mechanism 34 from the output force increasing condition to the output force maintaining condition.

Figure 6:
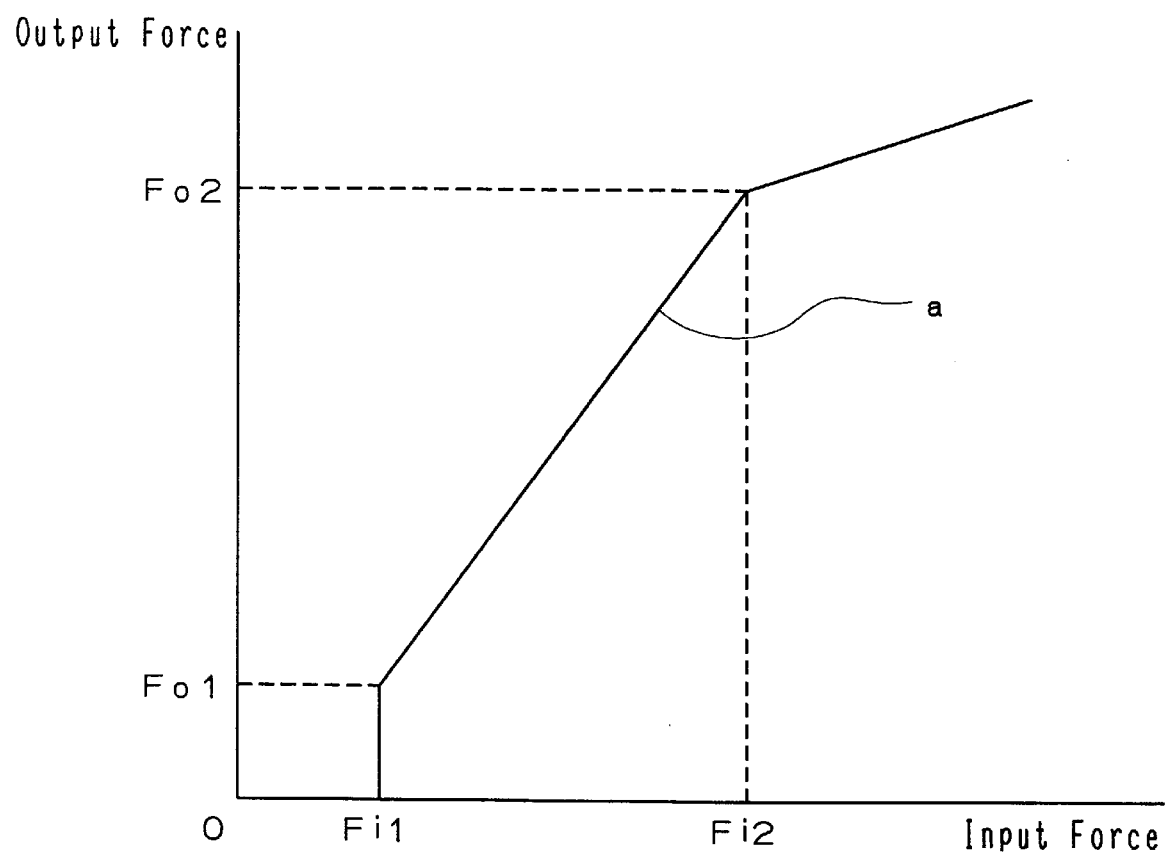
FIG. 6 is a graph depicting the input-output force characteristics of the vacuum servo unit according to the first embodiment of the present invention

Upon the transfer of the valve mechanism 34 from the output force increasing condition to the output force maintaining condition, the retraction of the reaction disc 48 causes the reaction disc 48 to contact the first member 281. However, the reaction force corresponding to the output force from the output rod 49 is not transferred to the input member 28. Under the above condition, the input force applied to the brake pedal 80 by the driver's operation to the input member 28 is set to be Fi1 as shown in FIG. 6. The output force applied to the master cylinder 52 from the output rod 49 becomes Fo1 as also shown in FIG. 6. The above description indicates that the "jumping operation" is being carried out. The jumping operation represents the output value being increased from zero to Fo1 directly when the input member 28 is applied with the constant input force Fi1 without the reaction force from the reaction disc 48. The output value Fo1 (jumping output force) generated by the jumping operation is based on the distance (C+E–A) which is approximately equal to the rearward expansion amount of the reaction disc 48.

Next, the self-operation or automatic operation of the actuator 41 according to the first embodiment of the present invention is described in detail. When the solenoid coil 42 is electrically controlled with the amount i0.5 of the electric current by the electronic control device 50, an electromagnetic attraction force is generated between the movable core 45 and the stationary core 44. Accordingly, the movable core 45 and the third member 283 are advanced in the forward direction relative to the power piston 22 and the second member 282 against the biasing force of the valve spring 91. Corresponding to this forward movement of the movable core 45 and the third member 283, the first member 281 engaged with the inward flange portion 45a of the movable core 45 via the engaging portion 281a is moved in the forward direction relative to the power piston 22 and the second member 282. Due to the forward movement of the movable core 45, the third member 283, and the first member 281 over a distance of C, the front end portion of the first member 281 comes into contact with the rear surface of the reaction disc 48.

The rubber annular member 281c disposed between the first member 281 and the movable core 45 is elastically deformable back and forth. Therefore, after the contact of the reaction disc 48 with the first member 281, the movable core 45 and the third member 283 are further moved in the forward direction. Under the above condition, the deformation amount of the rubber member 281c becomes D0.5. The forward movement of the movable core 45 and the third member 283 is equal to the distance of D0.5 after the contact of the reaction disc 48 with the first member 281. The driving force generated by the actuator 41 becomes Fa0.5 relative to the amount i0.5 of current supplied to the solenoid coil 42. Therefore, the first member 281 is advanced in the forward direction by virtue of the driving force Fa0.5 of the actuator 41.

According to the forward movement of the third member 283 by a distance of (C+D0.5), the negative pressure sealing portion 35b comes into contact with the negative pressure valve seat 22b, wherein the negative pressure valve V2 is closed. Therefore, the valve mechanism 34 establishes the output force maintaining condition. Furthermore, the atmospheric sealing portion 35a is separated from the air pressure valve seat 28a and so the air pressure valve V1 is opened. Therefore, the valve mechanism 34 establishes the output force increasing condition. Under the above condition, the clearance between the atmospheric sealing portion 35a and the air pressure valve seat 28a becomes equal to the distance (C+D0.5−A).

By establishing the output force increasing condition of the valve mechanism 34, the forward directed force is applied to the power piston 22 and both movable walls 17, 20, wherein the power piston 22 is moved forward relative to the housing 14. Corresponding to the forward movement of the power piston 22, the reaction disc 48 is compressed and deformed by the power piston 22 and the output rod 49, and is expanded or deformed in the rearward direction. The first member 281, the rubber member 281c, the movable core 45 and the third member 283 receive the reaction force corresponding to the output force of the output rod 49 and are thus retracted in the rearward direction.

Upon the retraction of the first member 281, the rubber member 281c, the movable core 45 and the third member 283, the valve mechanism 34 is changed over to the output force maintaining condition from the output force increasing condition. The expanded amount of the reaction disc 48 is equal to the distance (C+D0.5−A) between the atmospheric sealing portion 35a and the air pressure valve seat 28a. Under the above condition, the driving force Fa0.5 from the actuator 41 corresponding to the amount i0.5 of current is applied to the first member 281. The above condition indicates the "jumping operation" being carried out at the output force Fo0.5 by the vacuum servo unit 10 according to the first embodiment of the present invention.

Figure 8:
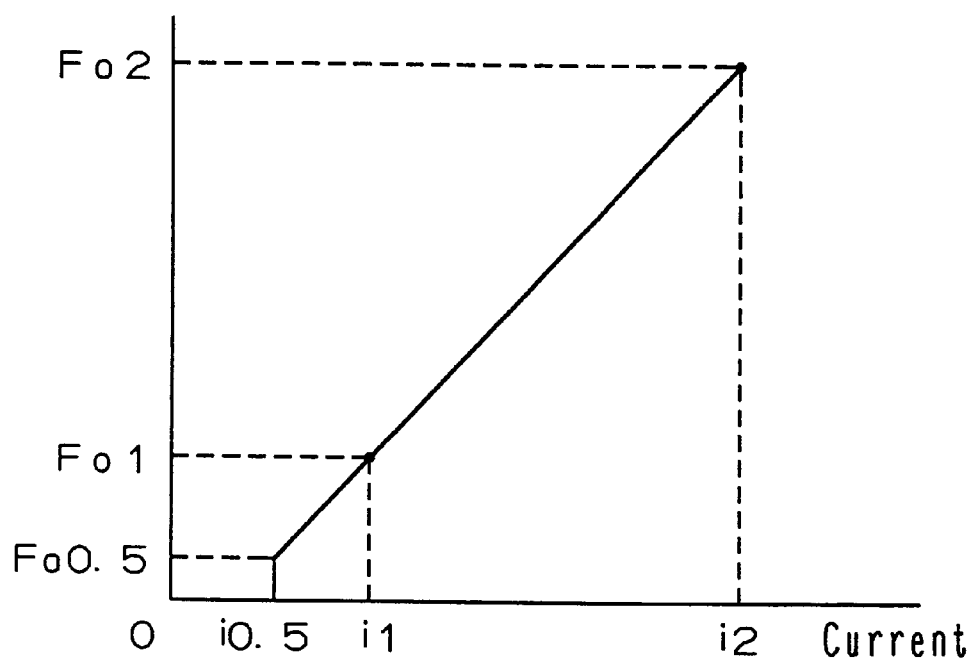
FIG. 8 is a graph depicting the electric current and output force characteristics of the vacuum servo unit according to the first embodiment of the present invention.

When the actuator 41 is inactive and the normal braking operation by the driver is carried out, the output force of the jumping operation is Fo1 corresponding to the expanded amount (C+E−A) of the reaction disc 48 as described above. On the other hand, upon self-operation or automatic operation of the actuator 41, the expanded amount of the reaction disc 48 is (C+D0.5−A), as described above. Because the amount D0.5 is smaller than the clearance E, the amount (C+D0.5−A) is smaller than (C+E−A). Therefore, the output force Fo0.5 of the jumping operation generated by the self-operation or automatic operation of the actuator 41 is smaller than the output force Fo1 generated by the normal braking operation by the driver (FIG. 8).

The output force of the jumping operation by the vacuum servo unit 10 of the present invention is set to be Fo1 during the normal braking operation by the driver. However, as described above, the output force according to the first embodiment can be continuously controlled with the output force of Fo1 or smaller than that during the self operation of the actuator 41 as the current is controlled within a range between i0.5 and i1. Therefore, when the normal braking operation is carried out, the output force of the jumping operation is maintained at the determined value (Fo1). When the self-operation of the actuator 41 is carried out, the output force of the jumping operation is set to be smaller than the output force (Fo1) of the jumping operation by the normal braking operation by the driver. Accordingly, a fine control of the output force and a sensitive braking operation such as during inter-vehicle distance control can be carried out by the vacuum servo unit 10 according to the first embodiment of the present invention.

Figure 4:
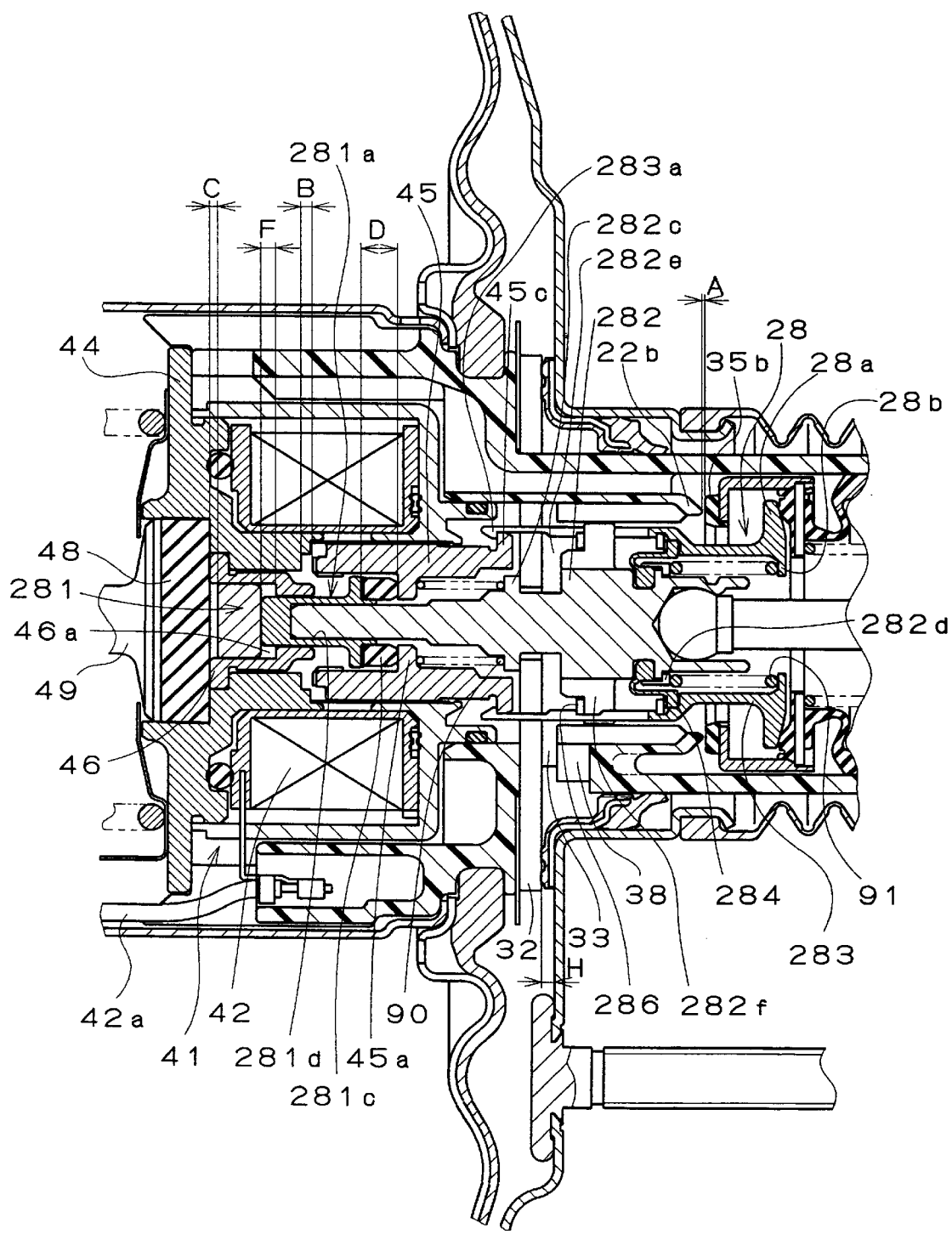
FIG. 4 is an enlarged cross-sectional view of the actuator and valve mechanism according to a second embodiment of the present invention.

Referring to FIG. 4, a second embodiment of the present invention is constructed so that the front-end portion of the second member 282 is positioned in the concave or recessed portion 281d and is slidably movable back and forth. The concave or recessed portion 281d opens in the rearward direction and is disposed at the rearward portion of the first member 281. The bottom surface of the concave portion 281d is in contact with the front end portion of the second member 282. Further, the first member 281 can be retracted in the rearward direction due to the rearward expansion of the reaction disc 48. However, the first member 281 can contact a stepped inner diameter portion 46a of the guiding member 46, whereby the retraction amount of the first member 281 in the rearward direction is regulated at a predetermined value F. The other parts and components associated with this second embodiment of the present invention are the same as those associated with the first embodiment described above and so a detailed explanation of such components and the associated operation is not repeated here for purposes of simplifying the description of this embodiment.

In accordance with this second embodiment, upon normal braking operation by the driver, the output force of the jumping operation corresponds to the clearance C between the rear surface of the reaction disc 48 and the front end portion of the first member 281.

In the self operation or automatic operation of the actuator 41 according to the second embodiment of the present invention, when the solenoid coil 42 is electrically controlled with the amount i1 of electric current by the electronic control device 50, the electromagnetic attraction force is generated between the movable core 45 and the stationary core 44. Accordingly, the movable core 45 and the third member 283 are advanced in the forward direction relative to the power piston 22 and the second member 282 against the biasing force of the valve spring 91. Corresponding to this forward movement of the movable core 45 and the third member 283, the first member 281 engaged with the forward flange portion 45a of the movable core 45 via the engaging portion 281a is moved in the forward direction relative to the power piston 22 and the second member 282. Due to the forward movement of the movable core 45, the third member 283 and the first member 281 by the distance C, the front end portion of the first member 281 comes in contact with the rear surface of the reaction disc 48.

The rubber annular member 281c disposed between the first member 281 and the movable core 45 is elastically deformable back and forth. Therefore, after the contact of the reaction disc 48 with the first member 281, the movable core 45 and the third member 283 are further moved in the forward direction. Under the above condition, the deformation amount of the rubber member 281c becomes D1. The forward movement of the movable core 45 and the third member 283 is equal to the distance D1 after the contact of the reaction disc 48 with the first member 281. The driving force generated by the actuator 41 becomes Fa1 corresponding to the amount i1 of current supplied to the solenoid coil 42. Therefore, the first member 281 is advanced in the forward direction by virtue of the driving force Fa1 of the actuator 41.

According to the forward movement of the third member 283 over a distance (C+D1), the negative pressure sealing portion 35b comes in contact with the negative pressure valve seat 22b, wherein the negative pressure valve V2 is closed. Therefore, the valve mechanism 34 establishes the output force maintaining condition. Furthermore, the atmospheric sealing potion 35a is separated from the air pressure valve seat 28a, wherein the air pressure valve V1 is opened. Therefore, the valve mechanism 34 establishes the output force increasing condition. Under the above condition, the clearance between the atmospheric sealing portion 35a and the air pressure valve seat 28a is equal to a distance of (C+D1−A).

By establishing the output force increasing condition of the valve mechanism 34, the power piston 22 and both movable walls 17, 20 are applied with the forward force, wherein the power piston 22 is moved forward relative to the housing 14. Corresponding to the forward movement of the power piston 22, the reaction disc 48 is compressed and deformed by the power piston 22 and the output rod 49, and expands in the rearward direction. The first member 281, the rubber member 281c, the movable core 45 and the third member 283 receive the reaction force corresponding to the output force from the output rod 49 so as to be retracted in the rearward direction.

Figure 9:
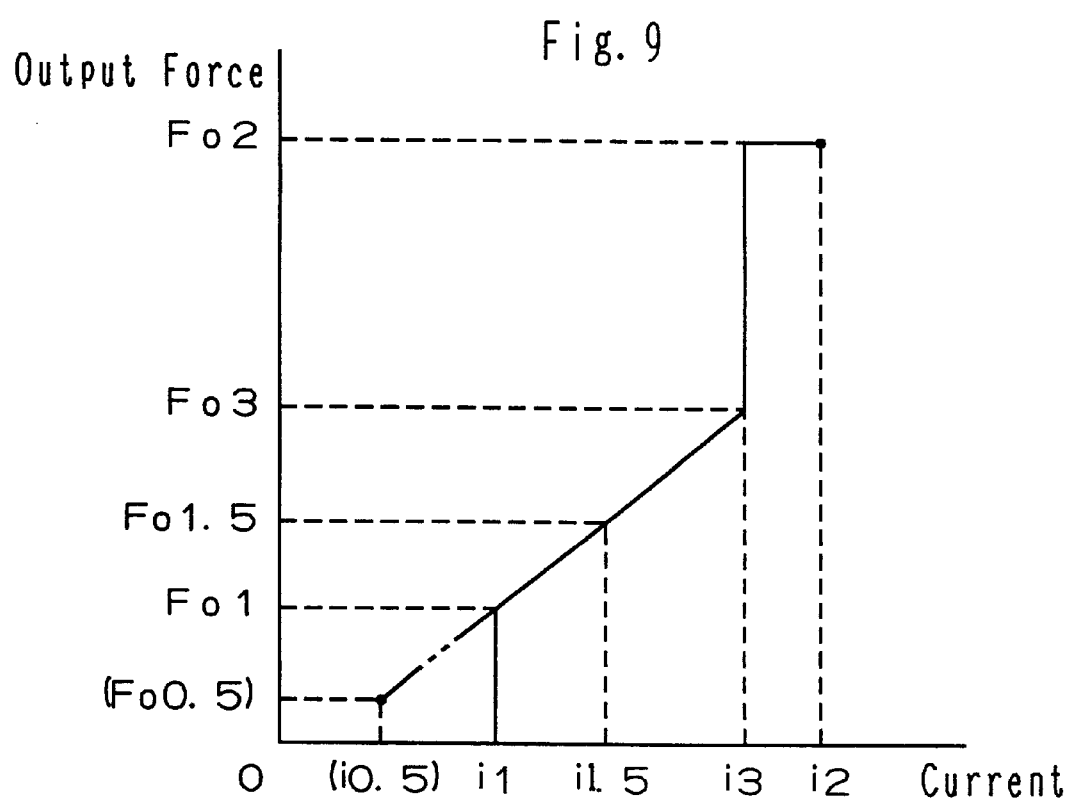
FIG. 9 is a graph depicting the electric current and output force characteristics of the vacuum servo unit according to the second embodiment of the present invention.

When the rearward expanding amount of the reaction disc 48 is less than the amount (C+F), the output force Fo1.5 is generated which corresponds to the current amount i1.5 as shown in FIG. 9. In other words, the output force generated by the vacuum servo unit 10 is approximately in proportion to the amount of current.

After the retraction of the first member 281, the rubber member 281c, the movable core 45 and the third member 283, and when the rearward expanding amount of the reaction disc 48 becomes (C+F), in other words when the first member 281 is in contact with the stepped inner diameter portion 46a of the guiding member 46, the reaction force corresponding to the output force of the output rod 49 is no longer transferred to the rubber member 281c, the movable core 45 and the third member 283 via the reaction disc 48. In other words, the approximately proportional relationship between the amount of current and the output force is terminated and the maximum output force Fo2 is generated by the vacuum servo unit 10 immediately.

Corresponding to the increase of the amount of electric current after the above described condition, the driving force of the movable core 45 is applied only for deforming the rubber member 281c, wherein the atmospheric sealing portion 35a is separated from the pressure seat valve 28a. Therefore, the air pressure valve V1 is opened. At this time, the maximum output force Fo2 is generated by the vacuum servo unit 10 (FIG. 9). Supposing the deformation amount of the rubber member 281c is set to be D2 from the condition in which the first member 281 is in contact with the reaction disc 48 to the condition in which the generated amount of electric current is transferred to i2, the distance between the air pressure valve seat 28a and the atmospheric sealing portion 35a during generation of the maximum output force Fo2 becomes (C+D2−A).

The output force of the jumping operation by the vacuum servo unit 10 of this embodiment can be maintained at Fo1 during the normal braking operation by the driver. Additionally, as described above, the output force according to the second embodiment of the present invention can be continuously controlled in proportion within the range between the output force of the jumping operation (Fo1) and the predetermined output force (Fo3) corresponding to the electric current supplied to the solenoid coil 42 during the self operation of the actuator 41. Furthermore, the maximum output force is generated by the re-jumping operation from the condition at the predetermined output force (Fo3). Therefore, the vacuum servo unit 10 according to the second embodiment of the present invention is ell suited for inter-vehicle distance control requiring sensitive braking operation. Further, the vacuum servo unit 10 according to the second embodiment serves as a pressure increase source for steering control under braking such as VSC control requiring the supply of the maximum output force from the vacuum servo unit 10 with high responsiveness.

Figure 5:
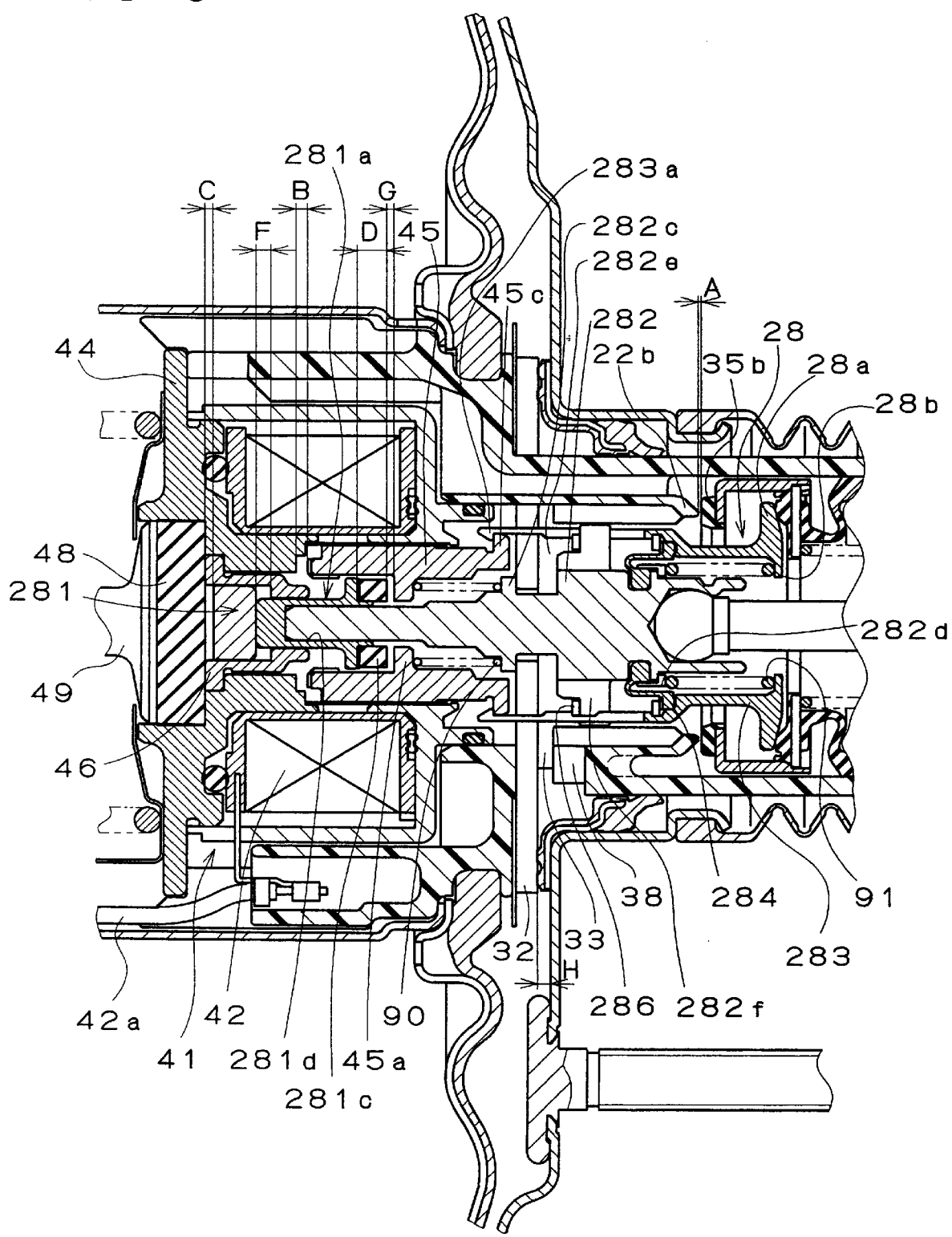
FIG. 5 is an enlarged cross-sectional view of the actuator and valve mechanism according to a third embodiment of the present invention.

Referring to FIG. 5, a third embodiment of the present invention is constructed so that as an addition to the construction of the second embodiment, a predetermined clearance G is defined between the rubber member 281c and the movable core 45. The other parts and components associated with the third embodiment are identical with those associated with the second embodiment and so a detailed explanation of such features is not repeated here.

With the third embodiment of the present invention, upon normal braking operation by the driver, the output force of the jumping operation by the vacuum servo unit 10 corresponds to the clearance C between the rear surface of the reaction disc 48 and the front end surface of the first member 281.

During self operation or automatic operation of the actuator 41, when the solenoid coil 42 is electrically controlled with the amount i1 of the electric current by the electronic control device 50, the electromagnetic attraction force is generated between the movable core 45 and the stationary core 44. Accordingly, the movable core 45 and the third member 283 are advanced in the forward direction relative to the power piston 22 and the second member 282 against the rearward force from the valve spring 91. Corresponding to the forward movement of the movable core 45 and the third member 283, the inward flange portion 45a of the movable core 45 comes into contact with the rubber member 281c to compensate for or eliminate the clearance G. Upon the contact of the inward flange portion 45a of the movable core 45 with the rubber member 281c, the first member 281 engaged with the movable core 45 via the engaging portion 281a is advanced in the forward direction.

With forward movement of the movable core 45, the third member 283 and the first member 281 over a distance (C+G), the front end portion of the first member 281 comes in contact with the rear surface of the reaction disc 48.

The rubber annular member 281c disposed between the first member 281 and the movable core 45 is elastically deformable back and forth. Therefore, after the contact of the reaction disc 48 with the first member 281, the movable core 45 and the third member 283 are further moved in the forward direction. Under the above condition, the deformation amount of the rubber member 281c becomes D1. The forward movement of the movable core 45 and the third member 283 is equal to the distance of D1 after the first member 281 contacts the reaction disc 48. The driving force generated by the actuator 41 is set to be Fa1 which is equal to the input force Fi1 applied to the solenoid coil 42. Therefore, the first member 281 is advanced in the forward direction by virtue of the driving force Fa1 of the actuator 41.

When the third member 283 moves forward over a distance (C+G+D1), the negative pressure sealing portion 35b comes in contact with the negative pressure valve seat 22b and so the negative pressure valve V2 is closed. Therefore, the valve mechanism 34 establishes the output force maintaining condition. Furthermore, the atmospheric sealing potion 35a is separated from the air pressure valve seat 28a so that the air pressure valve V1 is opened. Therefore, the valve mechanism 34 establishes the output force increasing condition. Under the above condition, the clearance between the atmospheric sealing portion 35a and the air pressure valve seat 28a is equal to a distance of (C+G+D1-A).

By establishing the output force increasing condition of the valve mechanism 34, the power piston 22 and both movable walls 17, 20 are applied with the forward moving force, thus moving the power piston 22 forward relative to the housing 14. Corresponding to the forward movement of the power piston 22, the reaction disc 48 is compressed and deformed by the power piston 22 and the output rod 49, and is expanded or deformed in the rearward direction. The first member 281, the rubber member 281c, the movable core 45 and the third member 283 receive the reaction force corresponding to the output force from the output rod 49 so as to be retracted in the rearward direction. Under the above condition, the rearward expanding amount of the reaction disc 48 is equal to (C+G+D1−A), wherein the output force (Fo11) of the jumping operation is generated corresponding to the expanding amount (C+G+D1−A).

Figure 10:
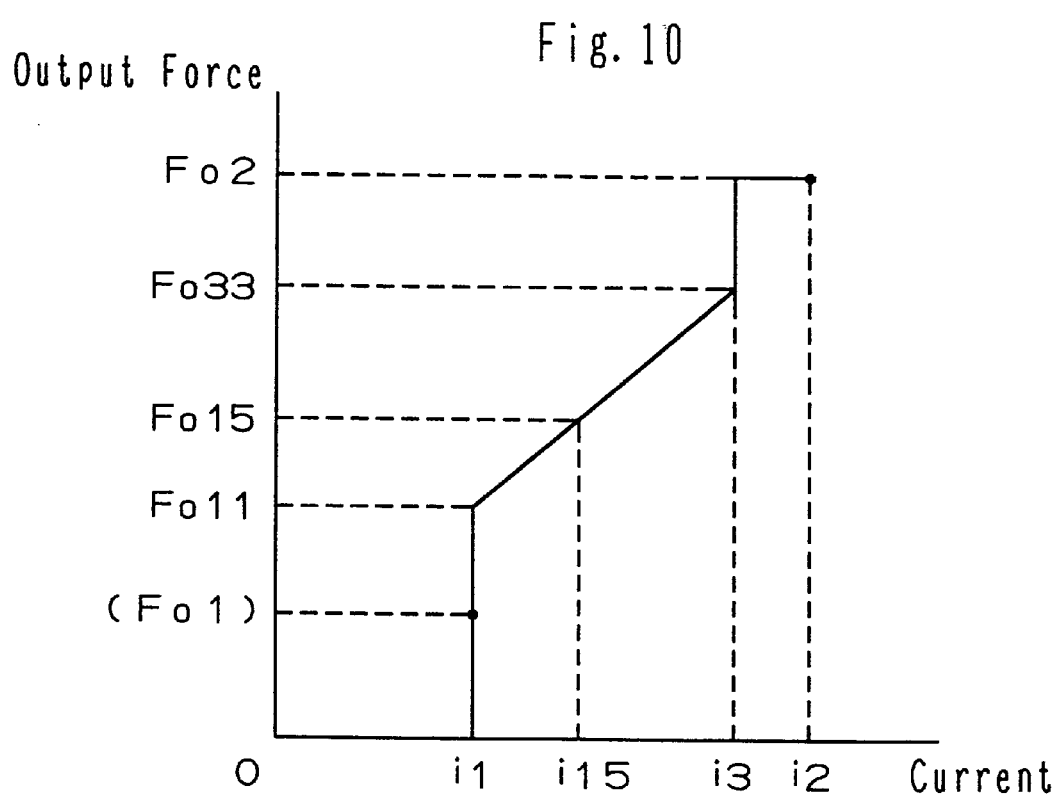
FIG. 10 is a graph depicting the electric current and output force characteristics of the vacuum servo unit according to the third embodiment of the present invention.

When the expanding amount of the reaction disc 48 becomes less than (C+F), the output force Fo15 is generated corresponding to the current amount i15 as shown in FIG. 10. In other words, the output force generated by the vacuum servo unit 10 is related approximately in proportion to the amount of current.

After the retraction of the first member 281, the rubber member 281c, the movable core 45 and the third member 283, and when the rearward expanding amount of the reaction disc 48 becomes (C+F), in other words when the first member 281 is in contact with the stepped inner diameter portion 48a of the guiding member 46, the reaction force corresponding to the output force of the output rod 49 is no longer transferred to the rubber member 281c, the movable core 45 and the third member 283 via the reaction disc 48. The approximately proportional relationship between the amount of current and the output force is terminated and the maximum output force Fo2 is generated by the vacuum servo unit 10 immediately.

In association with making the amount of current larger than the amount i3 of current after the above described condition, the driving force of the movable core 45 is applied only for deforming the rubber member 281c, wherein the atmospheric sealing portion 35a is separated from the air pressure seat valve 28a. Therefore, the air pressure valve V1 is opened. At this time, the maximum output force Fo2 is generated by the vacuum servo unit 10 as shown in FIG. 10. Assuming the deformation amount of the rubber member 281c is set to be D2 from the condition of first member 281 being in contact with the reaction disc 48 to the condition in which the generated amount of current is transferred to i2, the distance between the air pressure valve seat 28a and the atmospheric sealing portion 35a during generation of the maximum output force Fo2 becomes (C+D2−A).

As described above, the predetermined output force of the jumping operation required for the third embodiment of the present invention during the normal braking operation by the driver can be maintained larger than that required for the second embodiment. Further, the output force according to the third embodiment of the present invention can be continuously controlled in proportion within the range between the output force of the jumping operation (Fo11) and the predetermined output force (Fo33) corresponding to the current supplied to the solenoid coil 42 during the self operation of the actuator 41. Additionally, the maximum output force can be generated by the re-jumping operation from the predetermined output force (Fo33). Therefore, a continuous output force control can be carried out with a large output force being generated from the initial stage of the self operation of the actuator 41. Further, the vacuum servo unit 10 according to the third embodiment can serve as the pressure increase source for steering control under braking such as VSC control requiring the supply of a maximum output force from the vacuum servo unit 10 with high responsiveness.

Additionally, the retraction amount of the input member 28 is determined accurately to perform the above effective operation during self operation of the actuator 41. Therefore, for example, the distance H between the key member 32 shown in FIGS. 4 and 5 and the hole 33 radially defined in the power piston 22 is set to be larger than the clearance F.

The various embodiments of the present invention are described in the context of a tandem type vacuum servo unit 10, but the present invention is not necessarily limited in that regard. For example, the invention can be adapted for a single type vacuum servo unit while producing similar advantages as the tandem type vacuum servo unit 10. Additionally, although the actuator 41 is in the form of the electromagnetic solenoid coil 42, the electromagnetic movable core 45, the electromagnetic stationary core 44 and the electromagnetic yoke 43, the invention is not limited in that regard. So long as the vacuum servo unit can generate a second braking power which is different from the first braking power generated by the driver's brake pedal operation, the embodiments of the present invention can be employed. Additionally, although the rubber annular member 281c is employed as a force transfer member, other force transmitting members can be employed. So long as the force transmitting member can produce a deformation resistance, other force transmitting members such as a metal spring and a resin made member are possible. Further, as an alternative to the construction described above involving the clearance or space between the force transmitting member and the movable core 45, a space or clearance can be provided between the front portion of the input member and the force transmitting member.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vacuum servo unit comprising
   a housing;
   a movable wall disposed in the housing for dividing an interior of the housing into at least a front chamber and a rear chamber;
   a power piston connected to the movable wall and movable with the movable wall;
   an input member disposed in the power piston and movable in forward and rearward directions relative to the power piston by an input force;
   the input member having a front portion and a rear portion, with the rear portion being movable in the forward and rearward directions with respect to the front portion and including a front end portion, the front portion of the input member including an engaging portion and a recessed portion;

an output member operatively connected to the power piston for outputting a forward force of the power piston in response to movement of the movable wall;

a reaction member disposed between the input member and the output member, and being engageable with the engaging portion of the front portion of the input member, for transmitting a reaction force to the engaging portion of the input member corresponding to an output force generated by the output member;

a valve seat movable in forward and rearward directions in response to movement of the input member;

an actuator that includes a movable member for moving the front portion of the input member and the valve seat without moving the rear portion, and an actuating member for moving the movable member upon activation of the actuator to control a distance between the valve seat and the engaging portion of the front portion of the input member in response to a driving force;

a force transmitting member disposed between the front portion of the input member and the movable member of the actuator and being deformable in response to relative movement of the front portion of the input member and the movable member of the actuator;

a first axial space formed between the reaction member and the front portion of the input member; and a second axial space formed between an inner end surface of the recessed portion and a front end surface of the front end portion during non-actuation of the actuator.

2. The vacuum servo unit according to claim 1, wherein the movable wall is a first movable wall, the front chamber is a first front chamber and the rear chamber is a second rear chamber, and including a second movable wall disposed within the housing to form a second front chamber and a second rear chamber.

3. The vacuum servo unit according to claim 1, wherein the force transmitting member is a rubber member.

4. The vacuum servo unit according to claim 3, including a clearance between the force transmitting member and the movable member of the actuator.

5. The vacuum servo unit according to claim 1, including a clearance between the force transmitting member and the movable member of the actuator.

6. A vacuum servo unit comprising:

a housing;

a movable wall disposed in the housing for dividing an interior of the housing into at least a front chamber and a rear chamber;

a power piston connected to the movable wall and movable with the movable wall;

an input member disposed in the power piston and movable in forward and rearward directions relative to the power piston by an input force;

the input member having a front portion and a rear portion, with the rear portion being movable in the forward and rearward directions with respect to the front portion, the front portion of the input member including an engaging portion;

an output member operatively connected to the power piston for outputting a forward force of the power piston in response to movement of the movable wall;

a reaction member disposed between the input member and the output member, and being engageable with the engaging portion of the front portion of the input member, for transmitting a reaction force to the input member corresponding to an output force generated by the output member;

a valve seat movable in forward and rearward directions in response to movement of the input member;

an actuator that includes a movable member for moving the front portion of the input member and the valve seat without moving the rear portion, and an actuating member for moving the movable member upon activation of the actuator to control a distance between the valve seat and the engaging portion of the front portion of the input member in response to a driving force;

a force transmitting member disposed between the front portion of the input member and the movable member of the actuator and deformable in response to relative movement of the front portion of the input member and the movable member;

the front portion of the input member being retracted in the rearward direction relative to the power piston by the reaction member under a driving force of the actuator, the front portion of the input member being retracted relative to the power piston over a retracted distance that is limited to a predetermined value.

7. The vacuum servo unit according to claim 6, wherein the movable wall is a first movable wall, the front chamber is a first front chamber and the rear chamber is a second rear chamber, and including a second movable wall disposed within the housing to form a second front chamber and a second rear chamber.

8. The vacuum servo unit according to claim 6, wherein the force transmitting member is a rubber member.

9. The vacuum servo unit according to claim 8, including a clearance between the force transmitting member and the movable member of the actuator.

10. The vacuum servo unit according to claim 6, wherein the front portion of the input member extends through a guiding member, the guiding member having a stepped inner diameter portion engaged by the front portion of the input member during retracting movement of the front portion to define the retracted distance.

11. The vacuum servo unit according to claim 6, including a clearance between the force transmitting member and the movable member of the actuator.

12. A vacuum servo unit for a vehicle brake system having a brake operating member, a wheel cylinder and a master cylinder supplying brake pressure to the wheel cylinder, comprising:

a housing a movable wall disposed in the housing for dividing an interior of the housing at least into a front chamber and a rear chamber;

a power piston connected to the movable wall and movable with the movable wall;

an input member disposed in the power piston and movable in forward and rearward directions relative to the power piston by an input force generated by operation of the operating member;

the input member having a front portion and a rear portion, with the rear portion being movable in the forward and rearward directions with respect to the front portion, the front portion of the input member including an engaging portion;

an output member operatively connected to the power piston for outputting a forwarding force of the power piston to the master cylinder in response to the movement of the movable wall;

a reaction member disposed between the input member and the output member for transmitting a reaction force to the input member corresponding to an output force generated by the output member, the reaction member being engageable with the engaging portion of the front portion of the input member;

a valve seat movable in the forward and rearward directions in response to movement of the input member;

an actuator having a movable member for moving the front portion of the input member and the valve seat without moving the rear portion, and an actuating member for moving the movable member to control a distance between the valve seat and the engaging portion of the front portion of the input member in response to a driving force;

a force transmitting member disposed between the front portion of the input member and the movable member of the actuator and being deformable in response to relative movement of the front portion of the input member and the movable member; and the input member being operated to generate the input force in accordance with operation of the brake operating member.

13. The vacuum servo unit for a vehicle brake system according to claim 12, wherein the valve seat includes an air pressure valve seat provided between the rear portion and the power piston for advancing the power piston by introducing air into the rear chamber.

14. The vacuum servo unit for a vehicle brake system according to claim 12, including an axially extending space between the front portion of the input member and the force transmitting member.

15. The vacuum servo unit for a vehicle brake system according to claim 12, wherein the movable wall is a first movable wall, the front chamber is a first front chamber and the rear chamber is a second rear chamber, and including a second movable wall disposed within the housing to form a second front chamber and a second rear chamber.

16. The vacuum servo unit for a vehicle brake system according to claim 12, wherein the force transmitting member is a rubber member.

17. The vacuum servo unit for a vehicle brake system according to claim 16, including a clearance between the force transmitting member and the movable member of the actuator.

18. The vacuum servo unit for a vehicle brake system according to claim 12, including a clearance between the force transmitting member and the movable member of the actuator.

* * * * *